July 16, 1935.  H. C. BOWEN  2,008,385
BRAKE MECHANISM
Filed Jan. 9, 1931
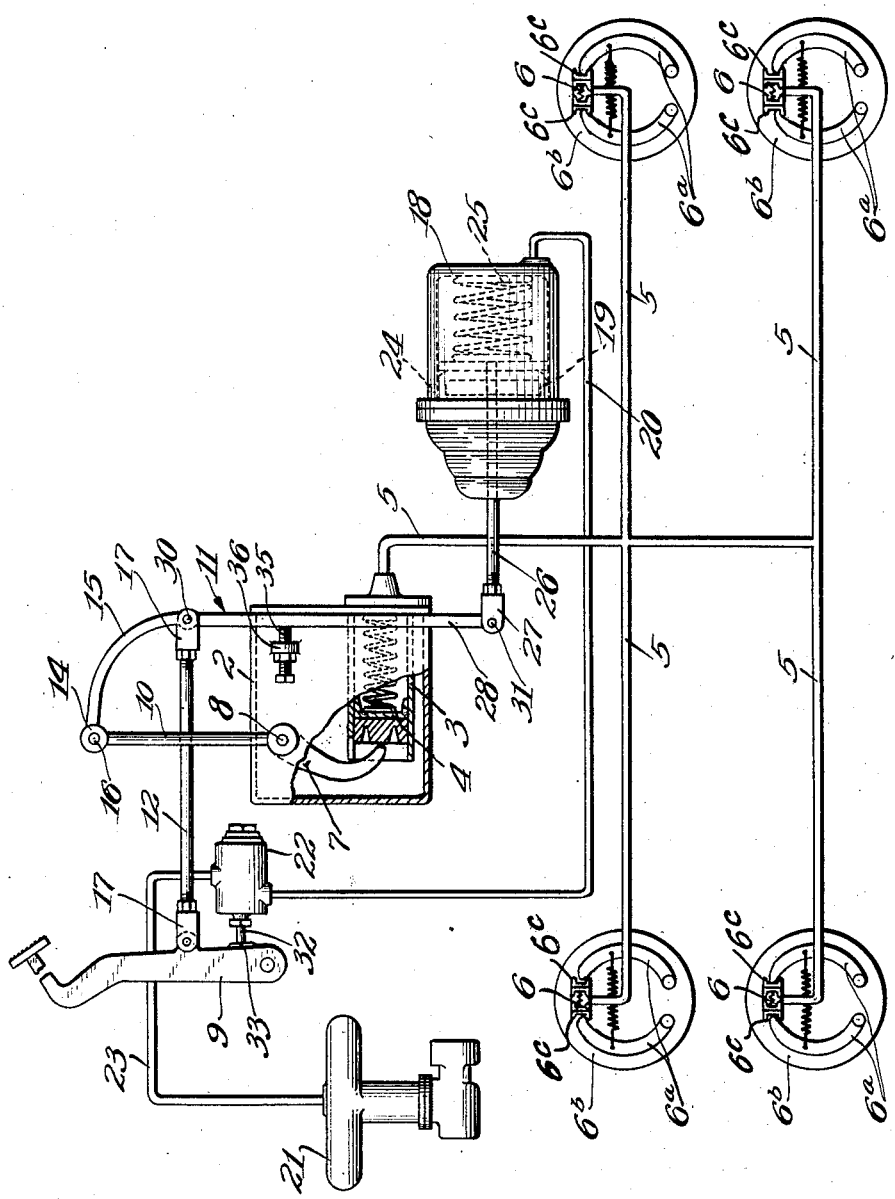
Inventor:
Herbert C. Bowen
By Williams, Bradbury, McCaleb & Hinkle
Attys.

Patented July 16, 1935

2,008,385

UNITED STATES PATENT OFFICE 2,008,385

BRAKE MECHANISM

Herbert C. Bowen, Detroit, Mich., assignor to Hydraulic Brake Company, Detroit, Mich., a corporation of California Application January 9, 1931, Serial No. 507,631

14 Claims. (Cl. 188—152)

The invention relates to braking systems for motor vehicles or the like and more particularly to a brake applying mechanism associated with the brake foot pedal of the vehicle for effecting a gain or increase in leverage over that which is applied by the brake pedal.

In a brake mechanism for motor vehicles or the like the leverage applicable to the brakes of a motor vehicle is directly proportional to the amount of available brake pedal travel and it is thus apparent that the pressure and stroke determine the total energy available in the application of the brakes. Various methods have been devised to overcome this lack of sufficient leverage by the use of booster systems by which they are commonly known. Certain characteristics in systems of this type are, however, undesirable, such as the lag in the application of the booster mechanism when the brake pedal is depressed and its failure to assist in the application of the brakes until a high brake pedal pressure is reached, with the result that its efficiency is decreased as the pedal pressure is increased.

It is to this end that I have devised a braking system which overcomes the undesirable characteristics, and an object of my invention is the provision of means which become effective the instant that the brake pedal pressure is applied and act to permit an increase in leverage with a predetermined brake pedal travel over that initially exerted by the brake pedal.

Another object of my invention is the provision of a combination of levers which, upon the application of pressure of the brake pedal, function instantly to apply pressure to the braking system.

A further object of my invention is the provision of a device operated by energy supplied by the motor of the vehicle for shifting the pivotal point of a certain one of the combination of levers upon a partial operation of the brake pedal to increase the available leverage for a predetermined travel of the brake pedal.

A still further object of my invention is the provision of a device operated by energy supplied by the motor of the vehicle and under the control of the brake pedal to shift a certain one of the combination of levers to permit an increase in physical leverage for a predetermined amount of pedal travel.

With these and other objects in view, the invention consists of novel details of construction and arrangement of parts as will be more fully hereinafter disclosed and particularly pointed out in the appended claims.

For the purpose of illustrating and describing my invention I have shown the same operating in connection with a fluid operated brake system such as is illustrated and described in a Patent No. 1,758,671, issued to Malcolm Loughead, May 13, 1930.

In the drawing I have shown the braking system more or less schematically and in which a fluid reservoir 2 is shown in communication with the master cylinder 3 (shown dotted) which lies within the reservoir 2. The master cylinder 3 has a piston 4 reciprocally supported therein for the purpose of supplying a fluid pressure through the conduits 5 to the brake cylinders 6 having pistons 6ᶜ for moving the shoes 6ᵃ into frictional engagement with the brake drum 6ᵇ. The brake pedal 9, when depressed, transmits movement to the lever 7 supported on the shaft 8 through the agency of the levers 10 and 11 and the link 12. This movement of the lever 7 actuates the piston 4 to provide fluid pressure for the aforesaid purposes. The lever 10 is pivotally secured at its one end to the shaft 8 and at its opposite end to the upper end 14 of the arcuate portion 15 of the lever 11 by a pin 16. The link 12 which connects the brake pedal 9 to the lever 11 is secured at its opposite ends to thimbles 17 pivotally secured, respectively, to the brake pedal and an intermediate portion of the lever 11.

A cylinder 18 is provided with a reciprocally mounted piston 19 which is influenced by the depression in the intake manifold 21 of the motor vehicle. The cylinder 18 forward of the piston 19 is connected to the manifold 21 by the conduits 20 and 23 through an interposed valve 22, the opening and closing of which is under the control of the brake pedal 9. The exhaustion of the cylinder 18 forward of the piston 19 permits air under atmospheric pressure to enter the cylinder to the rear of the piston 19 through an aperture 24 to force the same to the right with reference to the drawing, against the tension of the spring 25.

A connecting rod 26 for the piston 19 extends forward of the cylinder 18 and a thimble 27 pivotally secured to the end 28 of the lever 11 serves to connect the rod 26 to the lever 11. The fulcrum 35 against which the lever 11 normally rests serves as a fulcrum about which the lever 11 operates during initial movement of the brake pedal 9 to effect movement of the lever 7. The lever 11, upon the opening of the valve 22, is also moved under the influence of the piston 19 in the cylinder 18 to disengage the fulcrum point 35, and further movement of the lever 11 by the piston 19 causes the same to move about the pivotal point 30 between the lever 11 and link 12 as a fulcrum to effect further movement of the lever 10. The piston 19, upon reaching the limit of its stroke, arrests further movement of the lever 11 about the fulcrum 30 to shift the fulcrum about which the lever 11 will now operate to the pivotal point 31 between the lever 11 and the rod 26. This pivotal point thereafter serves as a fulcrum about which the lever 11 operates to bring about further movement of the lever 7. The leverage thus applied to the lever 7 during this portion of the movement of the lever 11 about the fulcrum 31 is greatly increased as will be more fully hereinafter described.

The cylinder 18 is connected to the intake manifold 21 of the motor through conduits 20 and 23 and valve 22 which is operatively associated with the brake pedal. The valve stem 32 of the valve 22 is normally engaged by a lug 33 on the brake pedal 9 to maintain the valve 22 normally closed, thus maintaining the cylinder 18 under atmospheric pressure through the valve 22. The valve, when opened by the movement of the brake pedal 9, shuts off the air and connects the cylinder 18 to the intake manifold 21 through the conduits 20 and 23. The valve 22 may be of any approved type such as illustrated and described in an application of C. C. Bradbury, filed December 21, 1929, Serial No. 415,648 now Patent No. 1,899,009, issued February 28, 1933.

The lever 11, when in normal position, rests against an adjustable stop in the form of a screw stop 35 adjustably mounted in a lug 36 integrally formed with the reservoir 2 and serves as a fulcrum about which the lever 11 operates as has already been pointed out in a general way and which will be more fully described later in the description.

Having described the various elements that go to make up my improved brake applying mechanism, I will now point out more fully its application for increasing or multiplying the leverage of the force applicable to the lever 7 for a predetermined travel of the brake pedal 9. It is well known that the leverage obtainable by manual operation is directly proportional to the amount of brake pedal travel available and as this amount of travel is limited it is not practical to increase the brake pedal travel proportionate to the increased weight or speed of the motor vehicle, though high leverage is most essential for efficient brake performance of the motor vehicle. With these objects in view I have devised a new and novel method of increasing the leverage obtainable for a predetermined travel of the brake pedal 9. The brake applying mechanism of my invention makes use of the vacuum cylinder 18 for the purpose of transferring the fulcrum about which the lever 11 operates upon the initial movement of the brake pedal 9 to a second fulcrum and the continued pressure of the brake pedal 9, then, is multiplied through levers 10 and 11 with the lever 11 moving about the fulcrum 31 as will be pointed out later.

The manner in which the change of leverage occurs may be briefly described as follows: In its normal position the lever 11 rests against the stop 35 so that the stop 35 constitutes the fulcrum around which the lever 11 operates before the pedal 9 has moved a distance sufficient to release the valve 22. When the lever has released the valve 22, the suction in the cylinder 18 causes the piston 19 to move forward rapidly. During this forward movement of the piston 19, the brake pedal 9 is held by the operator in the position to which it was initially moved to cause the operation of the piston 19, thereby causing the lever 11 to fulcrum about the pivot 30 during the movement of the piston 19 under the influence of the suction in the cylinder 18. When the piston 19 has moved its entire stroke and has come to rest, the lever 11 has moved away from the stop 35 so that, upon a subsequent movement of the brake pedal 9 in a brake applying direction, the lever 11 fulcrums about the pivot 31. Thus it will be seen that the lever 11, during the application of the brakes, fulcrums first about the stop 35, next about the pivot 30, and last about the pivot 31. The operation of the entire mechanism will now be more fully described.

When the driver of the vehicle depresses the brake pedal 9 the initial movement of the same to the left, with reference to the drawing, causes the link 12 to move the lever 11 about the stop 35 as a fulcrum to move the lever 10 forward. This initial movement of the lever 10 rotates the shaft 8 to swing the lever 7 to the right, thus forcing the piston 4 into the master cylinder 3 to displace the fluid therein. The initial movement of the pedal 9 also causes the lug 33 thereon to disengage the valve stem 32 of the valve 22 to open the same. The valve 22, having opened the cylinder 18, is now connected to the manifold 21 of the motor and the depression maintained therein by the operation of the motor causes the withdrawal of air from the cylinder 18. As the space forward of the piston 19 is being evacuated air under atmospheric pressure enters the cylinder 18 through the aperture 24 located to the rear of the piston 19, causing the same to move to the right rapidly against the normal compression of the spring 25. This rapid movement of the piston 19 moves the arm away from the stop 35 about the fulcrum 30. As the movement of the piston 19 continues the lever 11 is drawn away from the stop 35 and the lever 11, when thus disengaged from the stop 35, operates about the pivotal point 30 to cause further forward movement of the lever 10 to actuate the lever 7.

The movement of the lever 11 about the fulcrum 30 continues as just described until the piston 19 reaches the limit of its stroke when further movement of the lever 11 about the fulcrum 30 is arrested. The instant the movement of piston 19 is arrested, the pivotal point 31 between the lever 11 and the rod 26 becomes a fulcrum about which the lever 11 operates until the movement of the lever 11 to the left as viewed in the drawing is arrested by discontinuing the operation of the pedal lever 9 or by the engagement of the lever 11 with the stop 35.

The movement of the lever 11 about the stop 35 upon the initial movement of the brake pedal 9 and its subsequent movement about the fulcrum 30 while the piston is moving to the end of its stroke, causes the lever 10 to move forward and operate the lever 7 to actuate the piston 4, thus building up a fluid pressure which is discharged through the conduits 5 into the brake cylinders 6 to take up the slack in the system during the initial movement of the pedal 9. Pressure upon the brake pedal 9 after the piston 19 has reached the limit of its stroke, causes the lever 11 to operate about the pivotal point 31 as a fulcrum. This continued pressure on the brake pedal is multiplied through the leverage of the lever 11 and lever 10 as applied to lever 7.

If, for any reason, the vacuum for operating the piston 19 in the cylinder 18 fails, the application of pressure to the brake pedal 9 will cause the lever 11 to operate about the stop 35 as a fulcrum during the full pressure stroke of the brake pedal 9 to move the lever 10 forward. This forward movement of the lever 10 causes lever 7 to actuate the piston 4 in the master cylinder 3 to displace fluid therein and actuate the brake system.

While I have illustrated and described the leverage change mechanism for effecting a gain or increase in leverage over that applied, operatively associated with a typical hydraulic braking system, I do not, however, wish to limit its application to braking systems. Neither do I wish to be limited to the exact structure as shown as changes and modifications may readily suggest themselves, and I therefore aim to cover all such changes and modifications as come within the spirit and scope of the appended claims.

Having described the nature and embodiment of my invention, what I claim and desire to secure by United States Letters Patent is:

1. In a hydraulic brake system including a master cylinder, a piston in said master cylinder, a lever for actuating said piston, linking means connected to said lever and having a plurality of fulcrums providing leverages for transmitting forces to said lever, a manually operable brake pedal adapted to operate said linking means about a said fulcrum during initial movement of said brake pedal and about another said fulcrum upon a subsequent movement of said brake pedal, said linking means being arranged to provide a greater mechanical advantage when operated about the second said fulcrum than when operated about the first said fulcrum, and operable means operated upon the initial movement of said manually operable brake pedal to operate said linking means during the interim between such initial and subsequent movements of said brake pedal for shifting from the first said fulcrum to the second said fulcrum whereby to increase the mechanical advantage afforded by said linking means for such subsequent movement of said brake pedal.

2. In a hydraulic brake system including a master cylinder, a piston in said master cylinder, and a lever for actuating said piston, linking means having a plurality of fulcrums for providing different mechanical advantages for the operation of said lever, a manually operable brake pedal adapted to operate said linking means about at least two of said fulcrums providing different mechanical advantages, and suction operated means for shifting the fulcrum of said linking means from that providing a lesser mechanical advantage to that providing a greater mechanical advantage while said brake pedal is being operated to apply the brakes.

3. The combination with a hydraulic brake system of a manually operable brake pedal for controlling said system, linking operating connections adapted to provide different mechanical advantages for applying the brakes by said brake pedal, and suction operated means for operating said linking connections whereby to supplement the initial braking effort of said brake pedal at a lesser mechanical advantage and to operate said linking connections to obtain a greater mechanical advantage for the subsequent operation of said linking connections by said manually operable brake pedal.

4. In hydraulic transmission mechanism including a fluid conduit system, braking mechanism connected with said system and operable in response to variations in pressure of the fluid in said conduit, means for varying the pressure of the fluid in said conduit, a lever for operating the last said means, manual means for operating said lever, and separately operated means for increasing the mechanical advantage afforded by said lever.

5. In a hydraulic brake system including a brake pedal, a master cylinder, a piston in said master cylinder, and an actuating lever for said piston, connecting means between said brake pedal and said lever adapted to provide an initial mechanical advantage for initial movement of said brake pedal and to provide another mechanical advantage for a subsequent movement of said brake pedal in the operation of said lever, and manifold pressure operated means responsive to the brake pedal movement for changing from the initial mechanical advantage to said other mechanical advantage in actuating said piston from said brake pedal.

6. In a hydraulic brake system including a master cylinder, a piston therein, and a brake pedal for operating said piston, a linkage operable by said brake pedal to actuate said piston, said linkage having a plurality of fulcrums to provide a mechanical advantage for transmitting the force from said brake pedal to said piston during an initial movement of said brake pedal and to provide a greater mechanical advantage for transmitting the force from said brake pedal to said piston during a subsequent movement of said brake pedal, and means responsive to the initial movement of said brake pedal for shifting from a said fulcrum to another said fulcrum, whereby to change the leverage and the mechanical advantage for transmitting the force from said brake pedal to said piston.

7. In a braking system of the class described, the combination of brake drums, braking elements adapted to be brought into engagement with said drums, operating mechanism including a lever for engaging said elements with said drums in response to a force exerted by an operator, and suction operated means for shifting the fulcrum of said lever to increase the mechanical advantage afforded by said lever for the force applied by the operator.

8. In a braking system for a vehicle having an internal combustion engine, the combination of elements adapted to be brought into braking engagement with each other to retard the motion of the vehicle, operating mechanism including a lever for engaging said elements responsive to a force exerted by the operator of the vehicle, and means actuated by the vacuum created in the intake manifold of the internal combustion engine for increasing the mechanical advantage afforded by said operating mechanism and for simultaneously taking up the slack in the braking system.

9. In a brake applying mechanism for applying braking pressure in a hydraulic brake system, a manually operable pedal, a suction operated member controlled by said pedal and adapted to operate immediately upon initial movement of said pedal, and a linkage for transmitting forces from said pedal and said suction operated member to the hydraulic brake system, said linkage having a plurality of fulcrums and providing a mechanical advantage for the initial movement of said pedal to operate said suction operated member, providing another mechanical advantage during the operation of said linkage by said suction operated member, and providing a mechanical advantage greater than the first said mechanical advantage after the operation of said linkage by said suction operated member.

10. A brake applying mechanism for increasing the mechanical advantage of the braking force applied by an operator to increase the pressure in a hydraulic brake system, comprising a linkage having a plurality of fulcrums providing leverages for transmitting forces to operate the brake system, a suction operated element connected to said linkage and capable of actuating it to increase the mechanical advantage afforded thereby, and a manually operable brake pedal controlling said suction operated element and adapted to operate the said linkage before and after said suction operated element has actuated said linkage to increase the mechanical advantage afforded thereby.

11. A brake applying mechanism for supplementing the initial effort of an operator and for improving the mechanical advantage of the braking force applied by an operator to increase the pressure in a hydraulic brake system, comprising a linkage having a plurality of fulcrums providing leverages for transmitting forces to operate the brake system, said linkage being capable of manipulation to improve the mechanical advantage afforded by it, a manually operable brake pedal for operating said linkage in applying the brakes, and means controlled by said pedal for operating said linkage immediately upon initial movement of said brake pedal in applying the brakes, said means being adapted to manipulate said linkage during such operation thereof whereby the mechanical advantage afforded by said linkage is greater after such manipulation than it was before such manipulation.

12. In brake mechanism of the class described, the combination of a brake drum, a brake shoe adapted to be brought into engagement therewith, power transmission mechanism for applying said shoe, a lever for operating said mechanism, manual means for operating said lever, and separately operated means for increasing the mechanical advantage afforded by said lever.

13. In combination with a vehicle having an internal combustion engine, a rotatable member, a second member adapted to be moved into and out of engagement with said rotatable member, a manually operable lever for controlling said second member, operating connections between said second member and said lever adapted to provide different mechanical advantages for applying said second member by said lever, a vacuum cylinder connected with said internal combustion engine as a source of suction, means operated by said cylinder to shift said operating connections to provide greater mechanical advantage between said lever and said second member, and means for controlling communication between said cylinder and said engine.

14. In a hydraulic transmission mechanism for a vehicle having an internal combustion engine, a fluid pressure conduit system, a motor mechanism connected with said system and operable in response to variations of pressure of the fluid in the conduit system, means for varying the pressure of the fluid in said conduit system, a manually actuated lever for operating the last said means, suction operated means for increasing the mechanical advantage afforded by said lever, a connection between said suction operated means and said internal combustion engine, and control means for said suction operated means.

HERBERT C. BOWEN.